United States Patent

Suzuki

[11] Patent Number: 5,954,404
[45] Date of Patent: Sep. 21, 1999

[54] BABY SEAT SLIP DOWN PREVENTING DEVICE

[75] Inventor: Ito Suzuki, Saitama, Japan

[73] Assignee: Combi Corporation, Tokyo, Japan

[21] Appl. No.: 08/961,088

[22] Filed: Oct. 30, 1997

[30] Foreign Application Priority Data

Sep. 25, 1997 [JP] Japan ................................. 9-276686

[51] Int. Cl.[6] .................................................. A47C 35/00
[52] U.S. Cl. ................ 297/467; 297/219.12; 297/250.1; 297/485; 297/255; 280/647
[58] Field of Search ..................... 297/467, 485, 297/487, 488, 219.12, 250.1, 225, 255, 256.15, 256.16; 280/647

[56] References Cited

U.S. PATENT DOCUMENTS

| | | | |
|---|---|---|---|
| 1,704,346 | 3/1929 | Schneider | 297/467 X |
| 2,508,822 | 5/1950 | Goldberg | 297/255 |
| 2,652,183 | 9/1953 | Hlivka | 297/485 X |
| 2,872,203 | 2/1959 | Hedstrom . | |
| 3,484,135 | 12/1969 | Boudreau | 297/467 |
| 3,713,692 | 1/1973 | McCracken et al. | 297/467 |
| 4,157,839 | 6/1979 | Lahti et al. | 280/647 X |
| 4,293,144 | 10/1981 | Ida | 297/467 X |
| 4,345,777 | 8/1982 | Perego | 280/647 |
| 4,353,577 | 10/1982 | Giordani | 280/647 X |
| 4,568,125 | 2/1986 | Sckolnik | 297/467 |
| 4,650,252 | 3/1987 | Kassai | 297/467 |
| 5,238,293 | 8/1993 | Gibson | 297/485 X |
| 5,366,271 | 11/1994 | Johnston et al. | 297/250.1 |
| 5,482,352 | 1/1996 | Leal et al. | 297/219.12 X |
| 5,547,250 | 8/1996 | Childers | 297/485 X |
| 5,551,749 | 9/1996 | Reher et al. | 297/219.12 |
| 5,678,888 | 10/1997 | Sowell et al. | 297/219.12 X |
| 5,775,718 | 7/1998 | Huang | 280/647 X |

Primary Examiner—Peter M. Cuomo
Assistant Examiner—Rodney B. White
Attorney, Agent, or Firm—Whitham, Curtis & Whitham

[57] ABSTRACT

A seat cushion 17 is provided with a seat portion 17a, a back portion 17b provided so as to be continued to the seat portion 17a, and a leg-pad portion 17c. A get-out preventing cloth 17e is sewn onto the leg-pad portion 17c. The get-out preventing cloth 17e is sewn onto not only the front end but also the left and right sides of the leg-pad portion 17c. At the inside front portion of each of arm-rest cover portions 17d, a pocket 17f is provided in a state where the pocket 17f is opened at its rear end, and hook and loop fastener 24 is stuck inside the pocket 17f. A second crotch belt through hole 17n is formed in a suitable position of the get-out preventing cloth 17e so that a crotch belt 14 is inserted through this crotch belt through hole 17n.

17 Claims, 18 Drawing Sheets

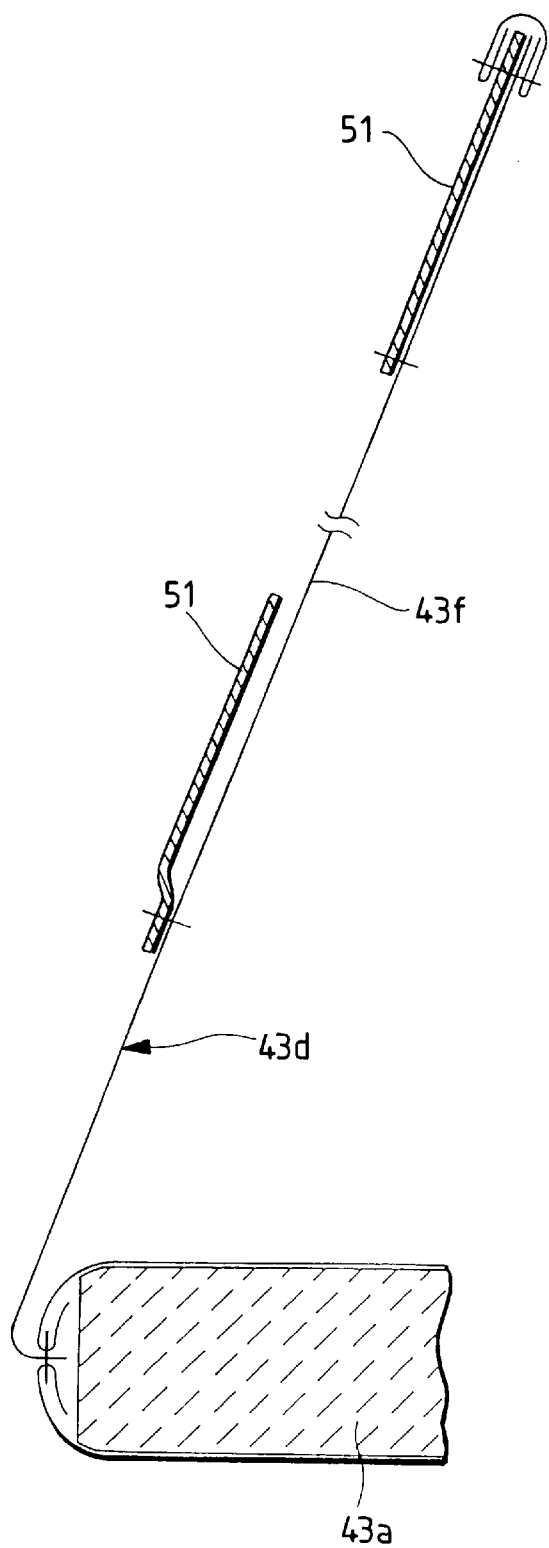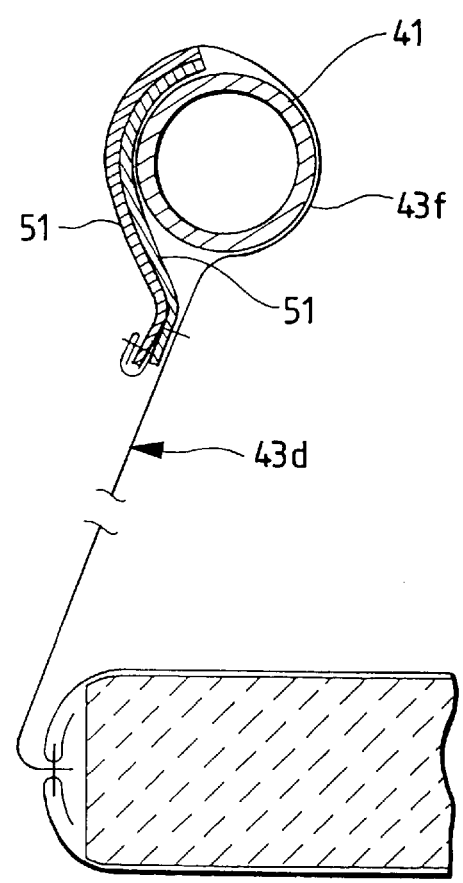

BABY SEAT SLIP DOWN PREVENTING DEVICE

BACKGROUND OF THE INVENTION

1. Field of the Invention

The present invention relates to a baby seat slip down preventing device, and particularly relates to a baby seat slip down preventing device for preventing a baby in a stroller or a baby chair from slipping down.

2. Related Art

Generally, as a stroller device, a so-called stroller is widely known. Such a stroller employs a mechanism for holding a baby by a crotch belt disposed so as to pass through the baby's crotch portion and a waist belt. On the other hand, a protective bar is provided in front of the baby to thereby prevent the baby from falling down forward.

However, there is a fear that a baby mounted on a seat of a stroller slides down through a space between the seat and a protective bar. As a measure to prevent such sliding down, it is possible to solve the problem by fitting, to the baby, a so-called foot cover provided for protection against the cold. Although a high chair, a low chair, a rocking chair, etc., are known as the baby chair, such a baby chair is not provided with the above-mentioned foot cover, and a baby is prevented from falling down forward by the aforementioned crotch and waist belts.

However, since the foot cover are provided for protection against the cold, there is no problem when they are used in winter, but when they are used in summer it is very hot for the baby on the seat and a burden is rather imposed on the baby. Further, not only the attachment/removal operation of the foot cover is troublesome, but also a space is required for accommodation and storage of the foot cover in an unused state because the foot cover are formed separately from the seat of the stroller.

SUMMARY OF THE INVENTION

The present invention has been made in view of the above-mentioned problems, and an object of thereof is to provide a baby seat slip down preventing device in which not only a baby can be prevented from sliding down surely without imparting any burden on the baby even if the device is used all the year round, but also the device can be accommodated without requiring a large space in an unused state of the device.

According to the present invention, provided is a baby seat slip down preventing device characterized by comprising a base seat provided on a body frame, a seat cushion removably provided on the base seat, a pair of side members disposed on opposite sides of the base seat, and a protective bar provided between the pair of side members, wherein the seat cushion includes a seat portion, a back portion provided so as to be continued to the seat portion, a leg-pad portion provided so as to be continued to the seat portion, a pair of side-member cover portions provided so as to be opposite to each other and so as to be continued to the seat portion to cover the side members respectively, and a get-out preventing portion connected to front end and opposite side end portions of the leg-pad portion so that the get-out preventing portion is capable of taking a using position and an accommodated position alternatively.

Further, the baby seat slip down preventing device is characterized in that the get-out preventing portion including a protective bar winding portion to be wound around the protective bar and first fastener members for holding the protective bar winding portion in a state where the protective bar winding portion is wound around the protective bar.

Further, the baby seat slip down preventing device is characterized in that the first fastener members are hook and loop fasteners.

Further, the baby seat slip down preventing device is characterized in that second fastener members are provided on side surface fixing pieces of the get-out preventing portion and fastener members to be fastened with the second fastener members are provided on the side-member cover portions respectively.

Further, the baby seat slip down preventing is characterized in that the second fastener members and the fastener members to be fastened with the second fastener members are hook and loop fasteners.

Further, the baby seat slip down preventing is characterized in that second fastener members are provided on side surface fixing pieces of the get-out preventing portion, pockets are provided on the side-member cover portions respectively, the fastener members to be fastened with the second fastener members are provided in insides of the pockets respectively, and the side surface fixing pieces are accommodated in the pockets respectively in a state where the get-out preventing portion is used.

Further, the baby seat slip down preventing is characterized in that the second fastener members and the fastener members to be fastened with the second fastener members are hook and loop fasteners.

Further, the baby seat slip down preventing is characterized in that a crotch belt through hole is formed in the get-out preventing portion for inserting a crotch belt provided on the base seat in the accommodated position.

Further, the baby seat slip down preventing is characterized in that the base seat is removably provided on the body frame.

Further, the baby seat slip down preventing is characterized in that the get-out preventing portion is made of cloth.

Further, according to the present invention, a baby seat slip down preventing device is characterized by comprising a base seat provided on a body frame and a protective bar provided in front of the base seat, wherein the base seat includes a seat portion, a back portion provided so as to be continued to the seat portion, a pair of side portions provided so as to be continued to the seat portion and so as to be in opposition to each other, and a get-out preventing portion connected to a front end portion of the seat portion and ends of the side portions so that the get-out preventing portion is capable of taking a using position and an accommodated position alternatively.

Further, the baby seat slip down preventing is characterized in that the get-out preventing portion including a protective bar winding portion to be wound around the protective bar and fastener members for holding the protective bar winding portion in a state where the protective bar winding portion is wound around the protective bar.

Further, the baby seat slip down preventing is characterized in that the fastener members are hook and loop fasteners.

Further, the baby seat slip down preventing is characterized in that a crotch belt through hole is formed in the get-out preventing portion for inserting a crotch belt provided on the base seat in the accommodated position.

Further, the baby seat slip down preventing is characterized in that the get-out preventing portion is made of cloth.

BRIEF DESCRIPTION OF THE DRAWINGS

FIG. 18 is a partial sectional view of the base seat to be used in the stroller of the third embodiment according to the present invention;

FIG. 19 is a partial sectional view showing the state of use of the base seat to be used in the stroller of the third embodiment according to the present invention;

DETAILED DESCRIPTION OF THE PREFERRED EMBODIMENTS

Figure 1:
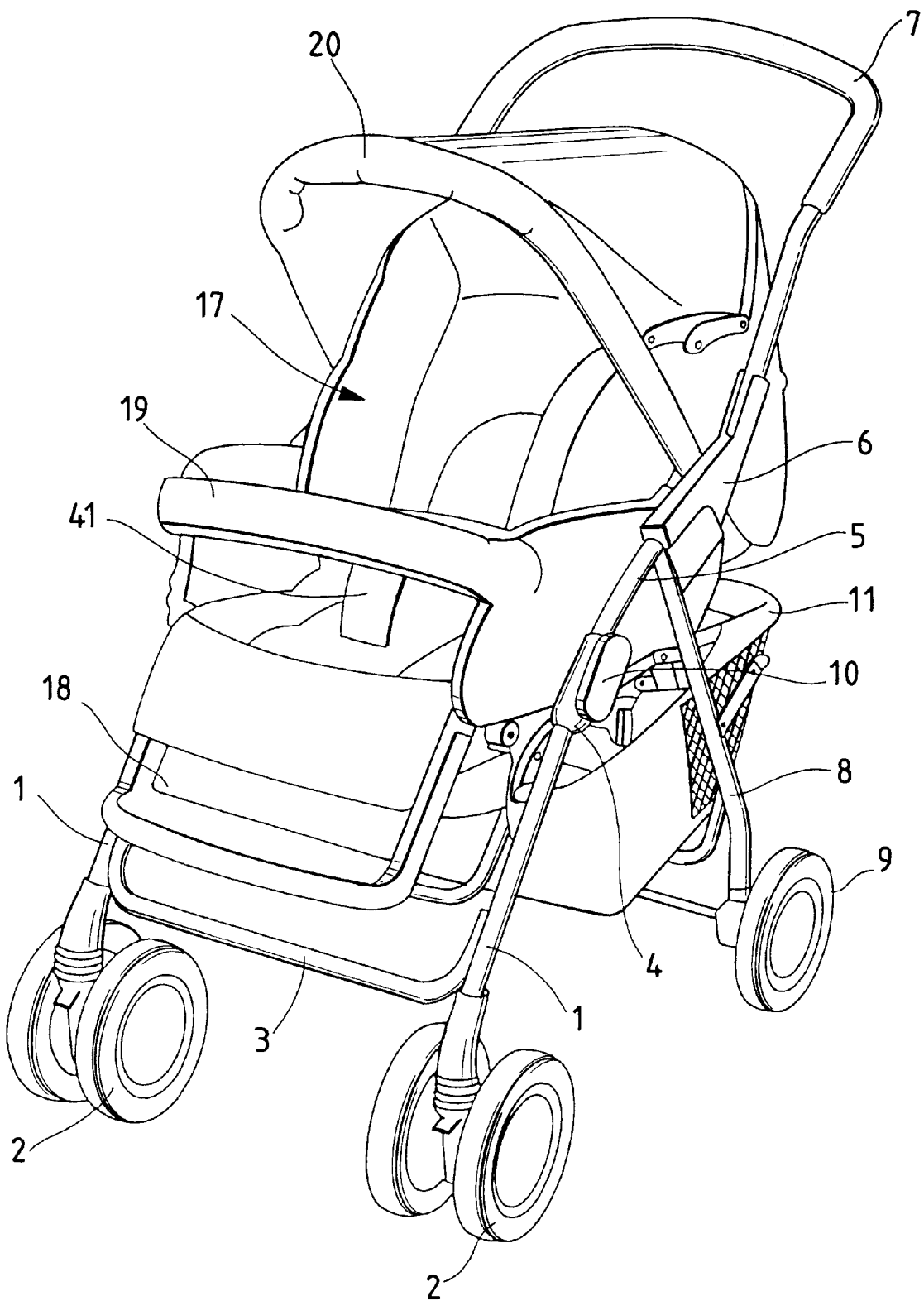
FIG. 1 is a schematic perspective view of a stroller according to the present invention.

Description about an embodiment of the present invention will be made below with reference to the accompanied drawings. FIG. 1 is a schematic perspective view showing the foldable stroller according to the present invention. In the drawing, the reference numeral 1 designates front tubes. Front wheels 2 and 2 are rotatably held on the front end portions of the front tubes 1 and 1 respectively. A connection rod 3 is provided between the two front tubes 1 and 1. Further, arm rods 5 are connected to base end portions of the front tubes 1 and 1 through joints 4 respectively, and arm rests 6 are connected to the arm rods 5 respectively. A substantially U-shaped handle 7 is provided between the right and left arm rests 6 (one of them is not illustrated). On the other hand, the right and left arm rests 6 are connected to rear tubes 8 respectively, and rear wheels 9 are rotatably held on the ends of the rear tubes 8 respectively. A first lock releasing lever (not shown) for changing-over the state from the opened state (the state of FIG. 1) to the closed state (the folded state which is not shown) is provided below the arm rest 6, and a second lock releasing lever 10 is provided on one of the joints 4. On the other hand, a basket 11 which acts as a detail box is provided between the pair of rear tubes 8 and 8 (one of them is not illustrated). The outline of the body frame is thus configured as described above.

Figure 2:
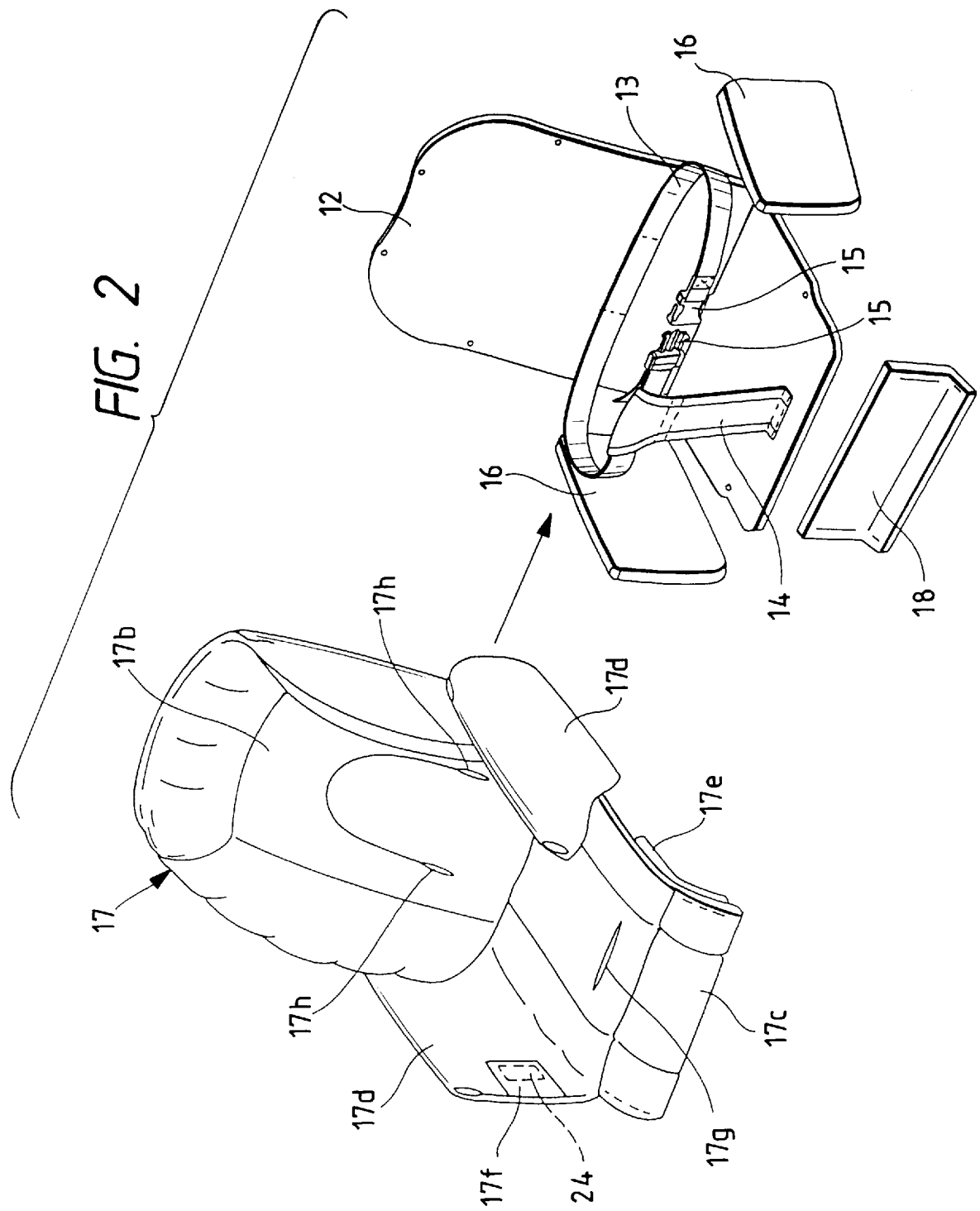
FIG. 2 is an exploded perspective view showing the outline of the seat mechanism portion of the stroller according to the present invention.

FIG. 2 is an exploded perspective view schematically showing a seat mechanism portion which is removably mounted on the above-mentioned body frame. In the drawing, the reference numeral 12 designates a base seat made from rigid plastics, the outer surface of the base seat 12 being covered with cloth (not shown). A waist belt 13 and a crotch belt 14 are provided on the base seat 12. Buckles 15 and 15 which can be engaged with each other are provided on the opposite end portions of the waist belt 13. Side panels 16 and 16 are provided on opposite sides of the base seat 12. The upper surface of the base seat 12 is covered with a seat cushion 17.

Figure 3:
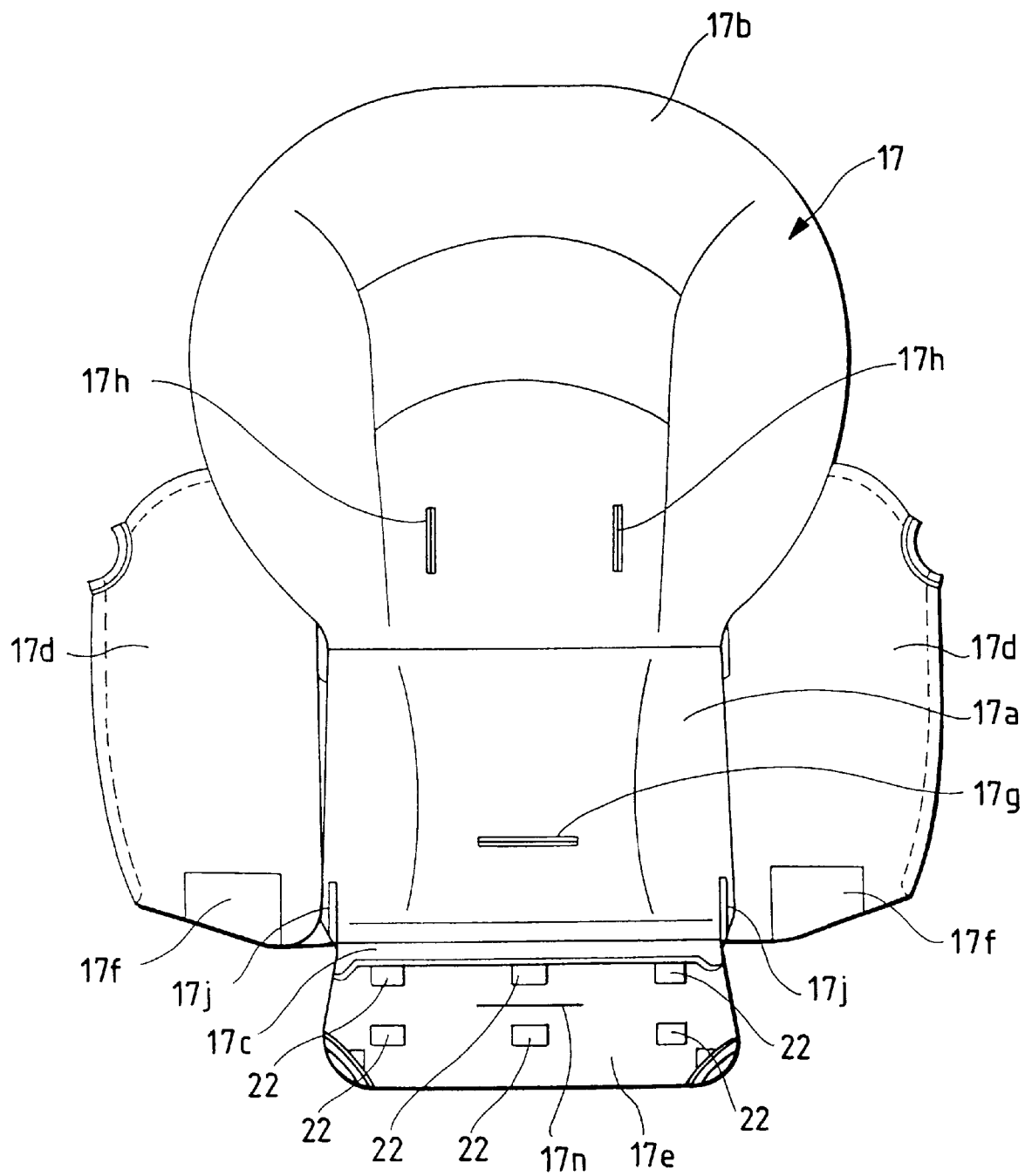
FIG. 3 is a plan view of the seat cushion to be in the stroller according to the present invention.
Figure 4:
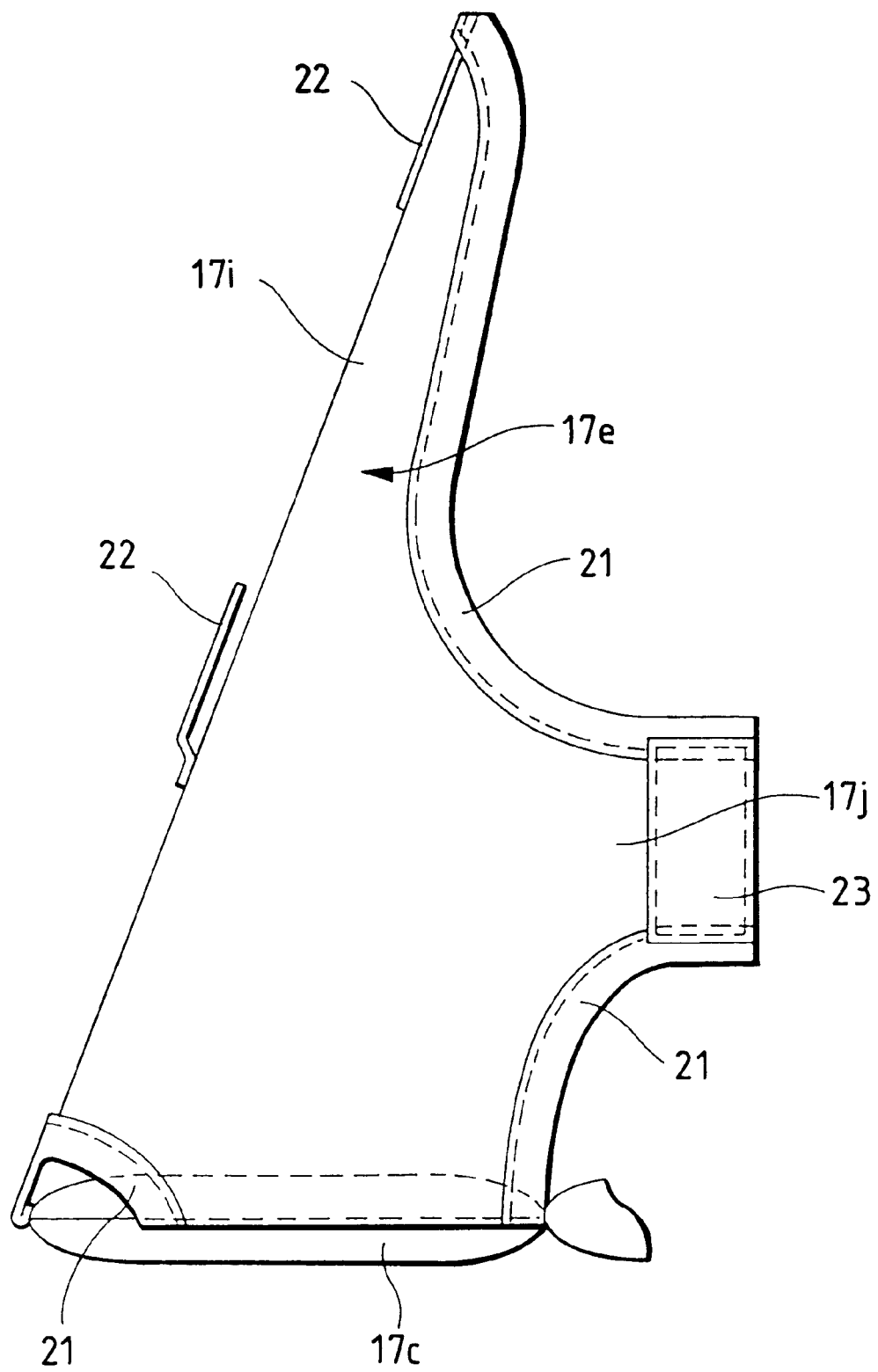
FIG. 4 is a partial side view of the seat cushion to be in the stroller according to the present invention.

FIG. 3 is a plan view showing the state of the seat cushion 17 in use. The seat cushion 17 is provided with a seat portion 17a, a back portion 17b connected continuously to the seat portion 17a, a leg-pad portion 17c connected continuously to the seat portion 17a on the opposite side to the back portion 17b, and a pair of arm rest cover portions 17d and 17d provided on the opposite sides of the seat portion 17a. A cloth-like get-out preventing portion 17e is sewn onto the leg-pad portion 17c on the opposite side to the seat portion 17a. The get-out preventing cloth 17e is sewn not only onto the front portion of the leg-pad portion 17c but also onto the right and left side portions of the same. This is to make the get-out preventing cloth 17e stand well when it is made to stand for use as shown in FIG. 4. Further, in FIG. 2, a pocket 17f is provided in the inside of each of the arm-rest cover portions 17d on its front side in such a state that the pocket 17f is opened at its rear end. A hook and loop fastener 24 is sewn on the inside of the pocket 17f. A first crotch belt through hole 17g for inserting the crotch belt 14 is formed through the seat portion 17a in a suitable position, and waist belt through holes 17h and 17h for inserting the waist belt 13 are formed through the back portion 17b in suitable positions. Further, a step 18 is pivotally provided on the base seat 12 at its front end portion.

Figure 5:
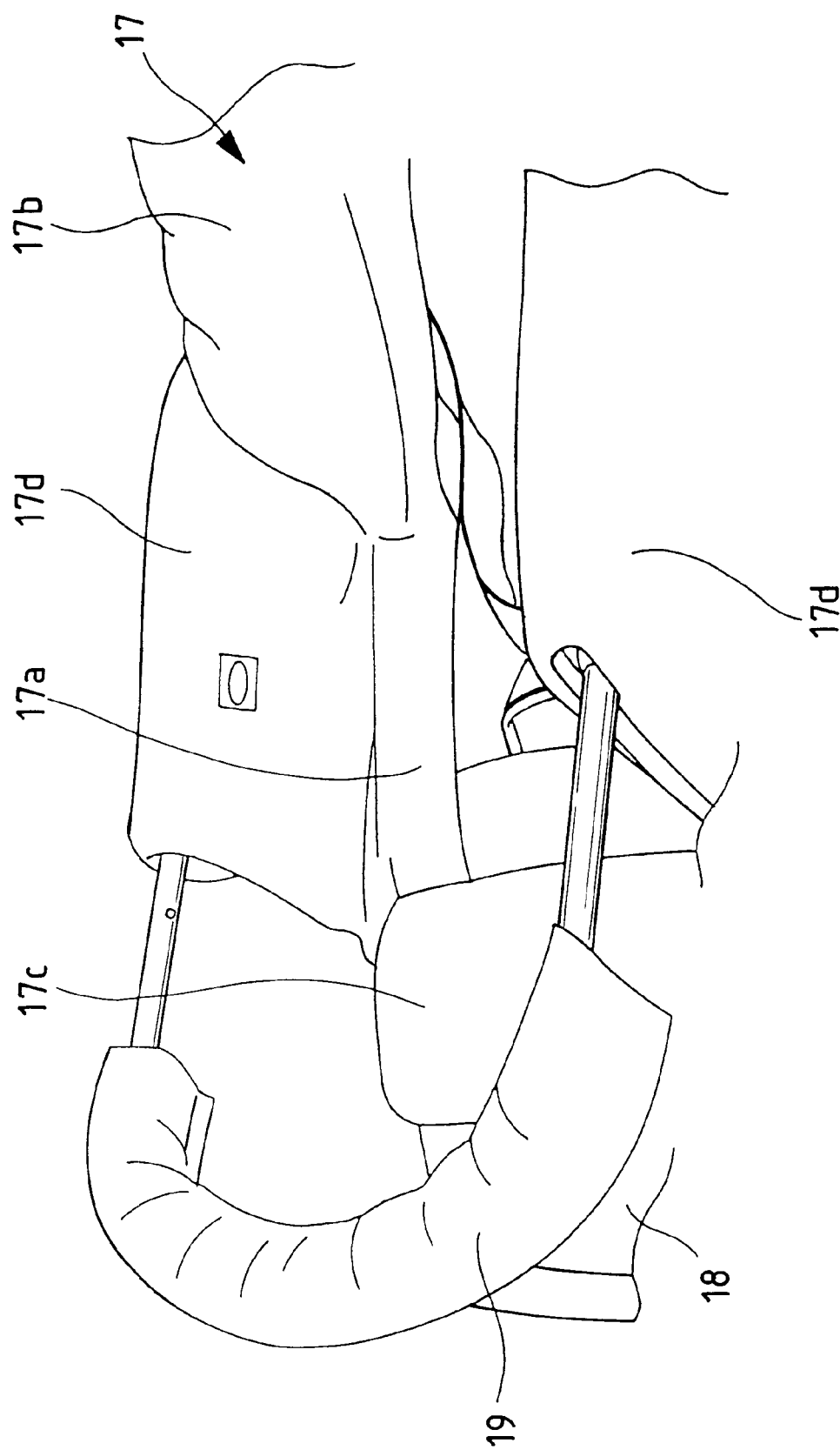
FIG. 5 is a perspective view of a main portion of the stroller according to the present invention.

In FIG. 1, a protective bar 19 is provided between the pair of side panels 16 (see FIG. 2) covered with the arm-rest cover portions 17d so as to be easily removable as shown in FIG. 5. In FIG. 1, the reference numeral 20 designates a sunshade hood.

Figure 6:
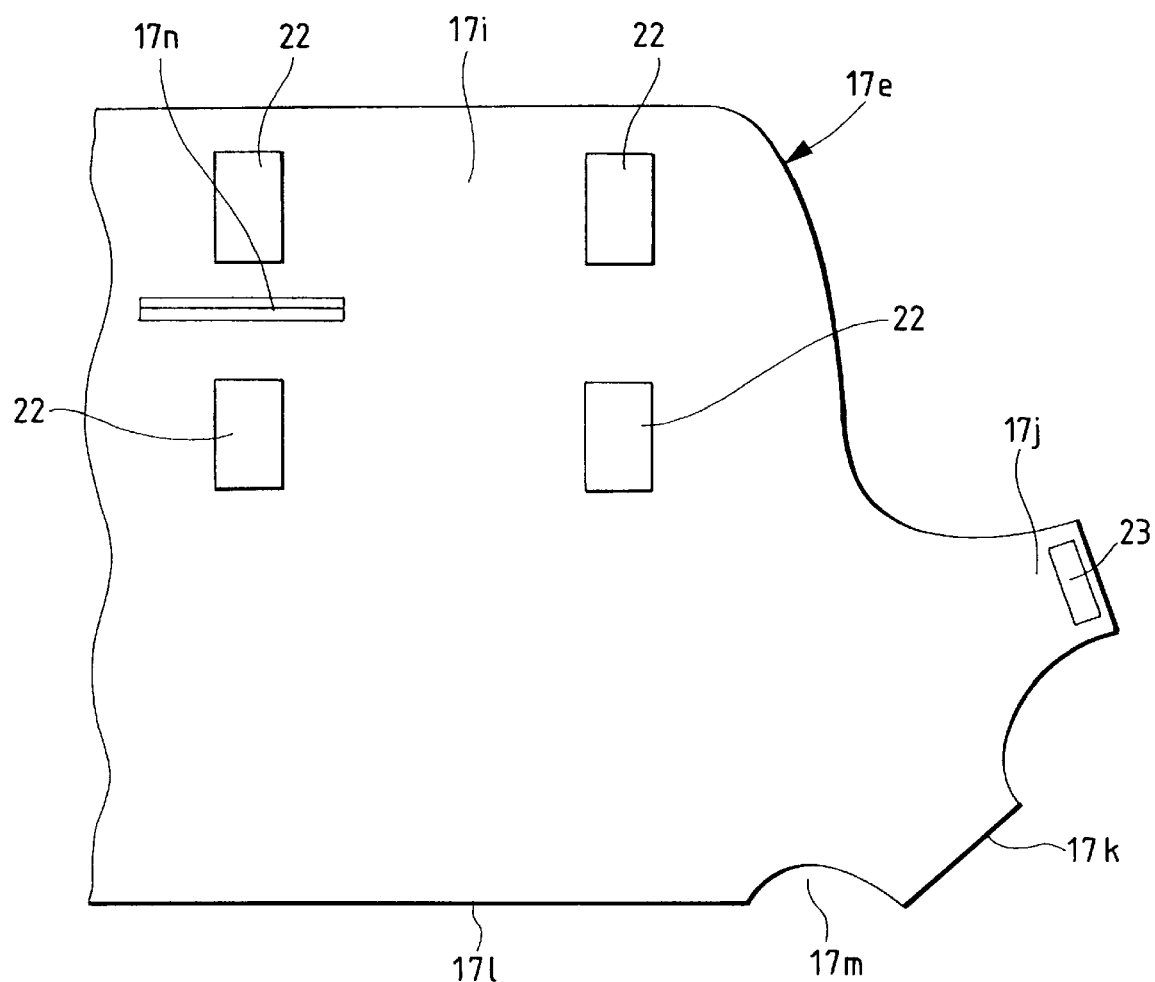
FIG. 6 is a plan view showing the shape of the get-out preventing cloth to be used in the stroller according to the present invention.

FIG. 6 is a plan view showing the get-out preventing cloth 17e to be used in the stroller according to the present invention. The get-out preventing cloth 17e is bilaterally-symmetrically formed, and it is provided with a protective bar winding portion 17i to be wound around the protective bar 19, side surface fixing pieces 17j continued to the protective bar winding portion 17i, side end sewing portions 17k continued to the side surface fixing portions 17j so as to be sewn onto the opposite side ends of the leg-pad portion 17c, and a front end sewing portion 17l to be sewn onto a front end of the leg-pad portion 17c. Further, notch portions 17m are formed between the front end sewing portion 17l and the respective side end sewing portions 17k. The formation of the notch portions 17m makes it possible to prevent the get-out preventing cloth 17e from being deformed both in the used position and unused position. A second crotch belt through hole 17n is formed through the get-out preventing cloth 17e for inserting the crotch belt 14 when the get-out preventing cloth 17e is unused.

In FIG. 4, bias tapes 21 are sewn on the end portions of the get-out preventing cloth 17e so as to prevent the cloth from becoming loose. Plane fasteners 22 and 22 are configured so that they are provided on the protective bar winding portion 17i so as to be fastened with each other when the protective bar winding portion 17i has been wound on the protective bar 19 (FIG. 1). Here, particularly, each of the lower hook and loop fasteners 22 in FIG. 4 is configured so as to be sewn only at its lower end onto the protective bar winding portion 17i so that the hook and loop fasteners 22 can be smoothly and surely fastened with each other. Further, a hook and loop fastener 23 is provided on each of the side surface fixing pieces 17j. The hook and loop fasteners 23 are configured so as to be fastened with hook and loop fastener 24 stuck on the inside of the respective pockets 17f.

Description will be made below about the operation in the case of using the stroller configured as described above.

First, in the ordinary using state, in FIG. 1, the crotch belt 14 is disposed between legs of a baby, the waist belt 13 is wound around the waist portion of the baby, and the buckles 15 are engaged with each other so that the baby can be held on the seat cushion 17 in a stable state. In this state, if one grasps the handle 7 and pushes the stroller, one can move the stroller.

For example, in a case of a few-month-old baby and when it is desirable to lay the baby down on the seat cushion 17, the back portion 17b is reclined by means of a known mechanism so that the seat portion 17a of the seat cushion 17 is made substantially parallel to the back portion 17b of the same, and the position of the leg-pad portion 17c is adjusted to be substantially parallel to the seat portion 17a.

Figure 7:
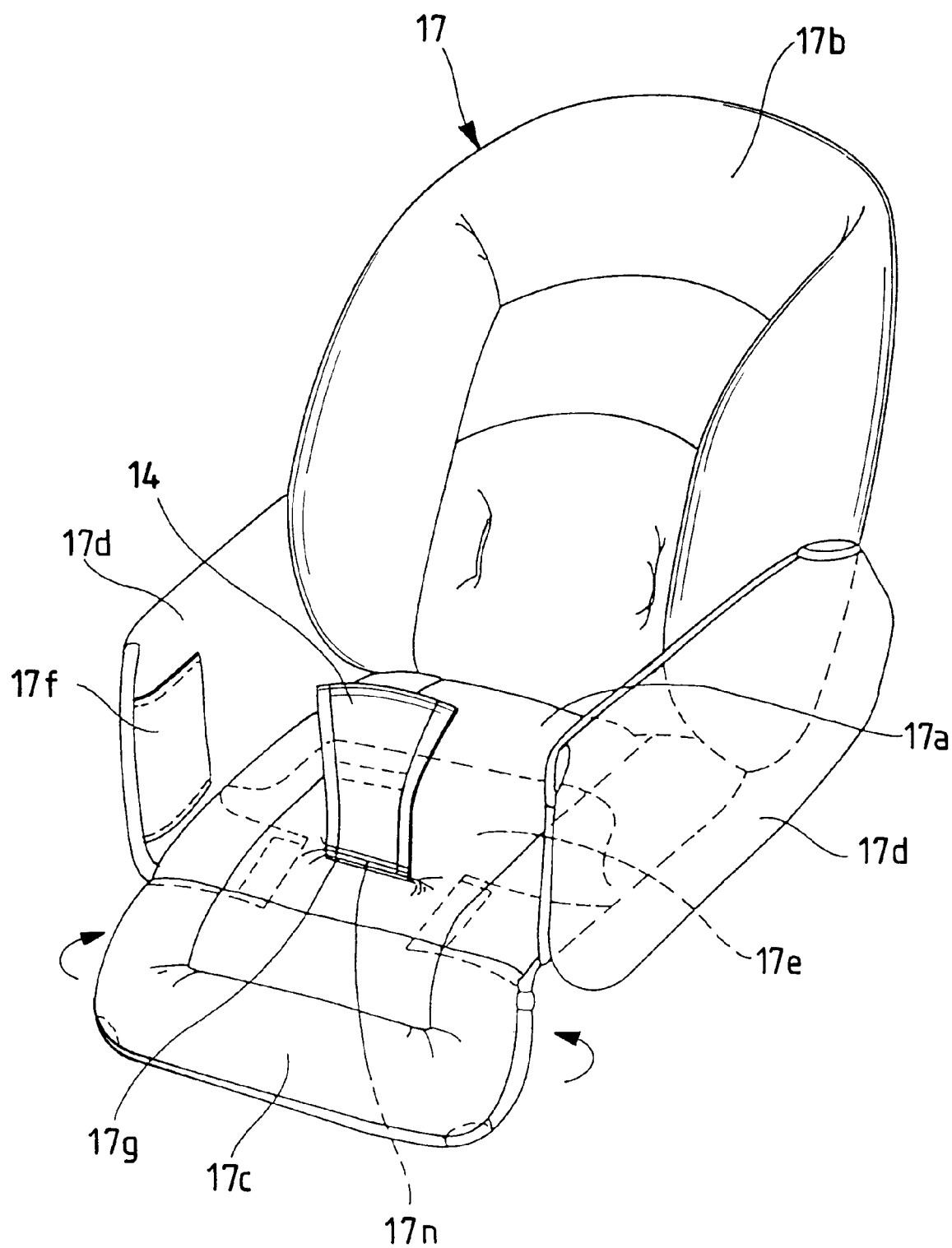
FIG. 7 a perspective view of the seat portion of the stroller according to the present invention.
Figure 8:
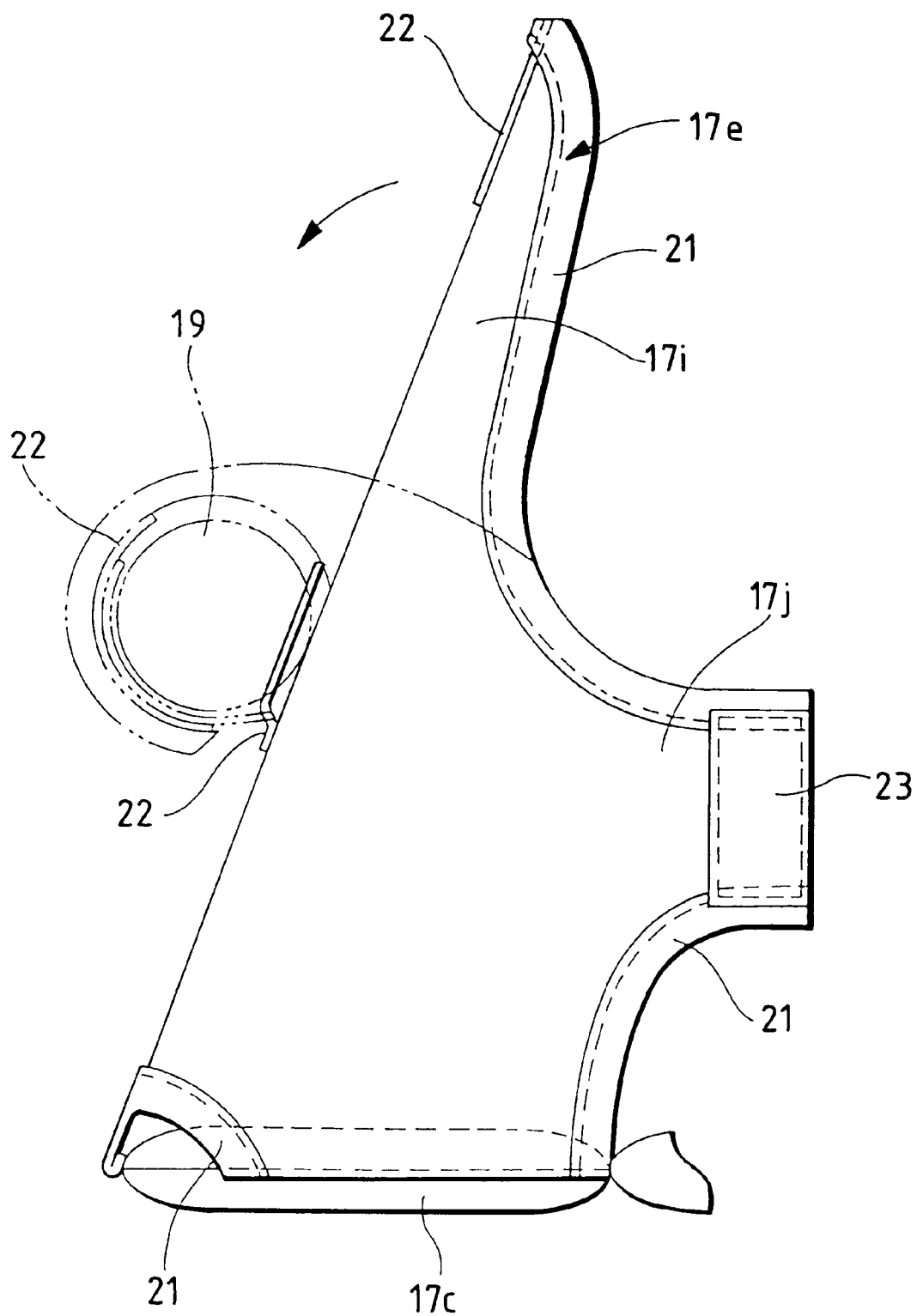
FIG. 8 is a partial side view of the seat cushion for explaining the attachment operation of the get-out preventing cloth to be used in the stroller according to the present invention.
Figure 9:
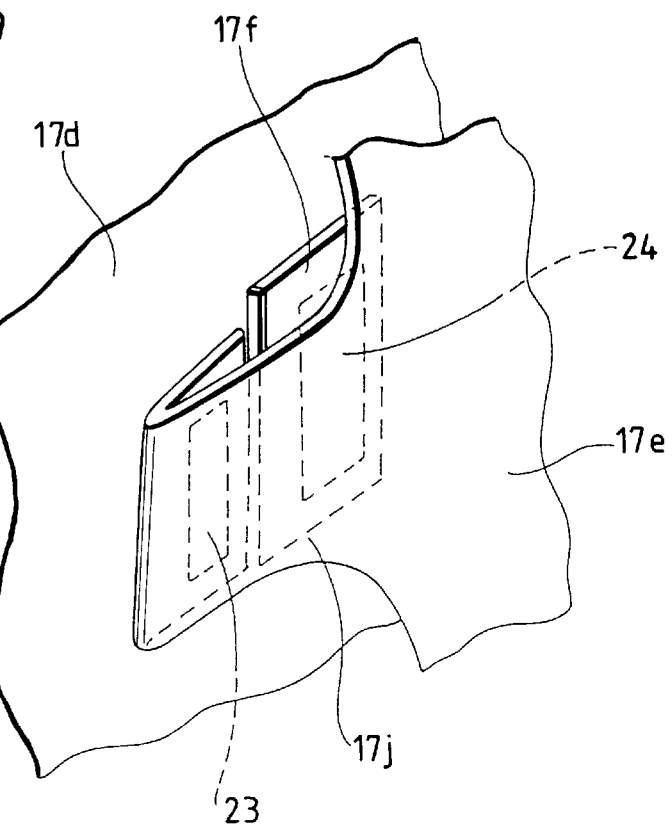
FIG. 9 is a partial perspective view of the seat cushion for explaining the attachment operation of the get-out preventing cloth to be used in the stroller according to the present invention.
Figure 10:
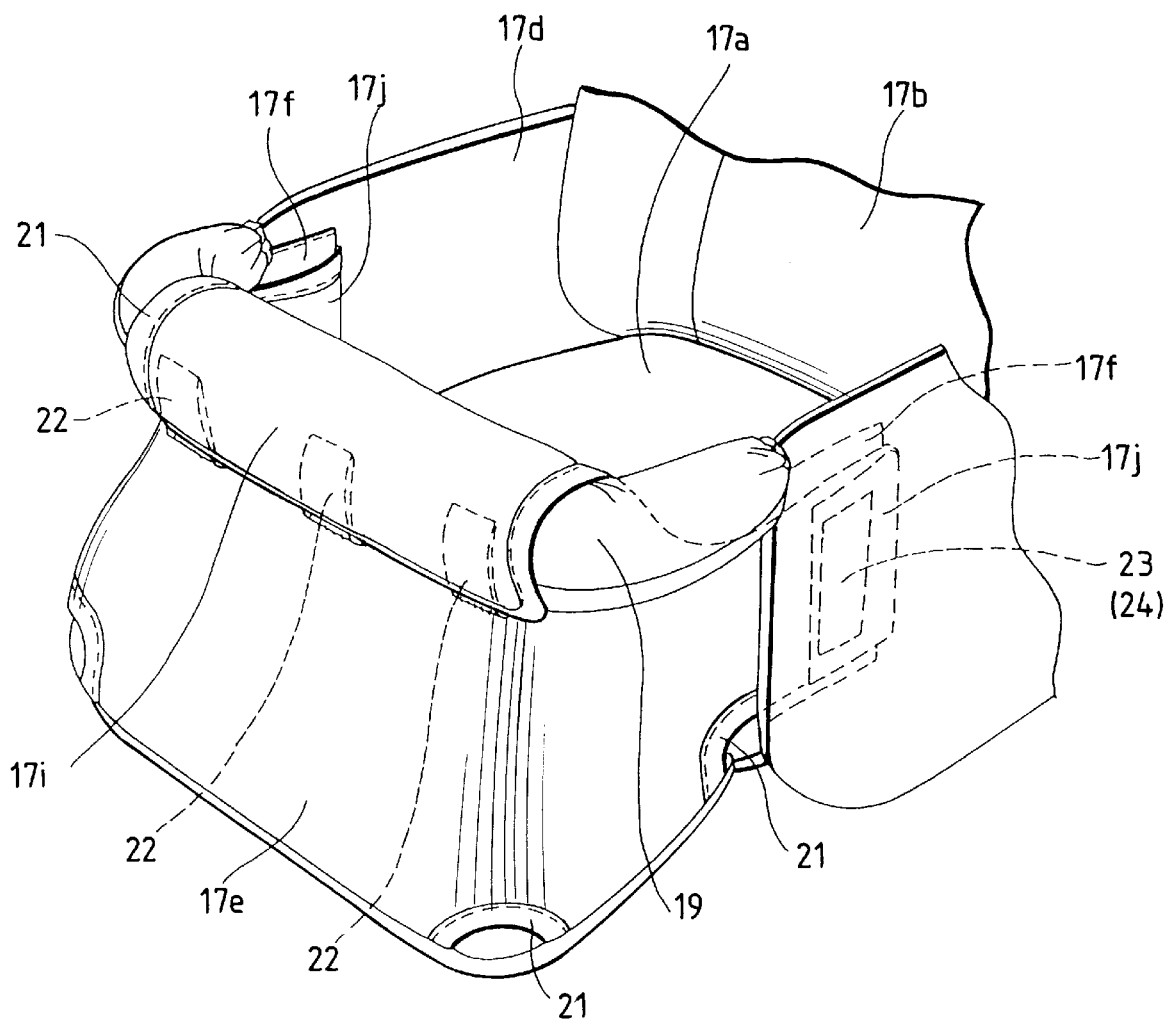
FIG. 10 is a partial perspective view showing the state of use of the get-out preventing cloth in the stroller according to the present invention.

Then, in FIG. 7, the crotch belt 14 is once removed from the first and second crotch belt through holes 17g and 17n, and then inserted again only through the first crotch belt through hole 17g. Further, the get-out preventing cloth 17e is turned over in the direction of arrows in FIG. 7 so as to stand relative to the leg-pad portion 17c as shown in FIG. 8. Thereafter, the protective bar winding portion 17i of the get-out preventing cloth 17e is wound around the outer periphery of the protective bar 19, and the hook and loop fasteners 22 are fastened with each other (as shown by an imaginary line in FIG. 8). At this time, since the lower hook and loop fastener 22 is sewn only at its lower ends onto the protective bar winding portion 17i, the hook and loop fastener 22 is wound around the outer periphery of the protective bar 19 so as to make the appearance of the hook and loop fasteners 22 and 22 fastened with each other impressive. As a result, a space between the seat and the protective bar 19 is covered at the front side of the seat cushion 17. Further, in FIG. 9, the side surface fixing pieces 17j of the get-out preventing cloth 17e are partially inserted into the respective pockets 17f provided in the inside of the arm-rest cover portions 17d, and the hook and loop fasteners 23 of the respective side surface fixing pieces 17j are fastened with the hook and loop fasteners 24 of the respective pockets 17f. At this time, the hook and loop fasteners 23 and 24 are fastened with each other in each of the pockets 17f so that they are prevented from easily separating from each other. Further, since the opening portion of each of the pockets 17f is formed backward, it is possible to expect such an effect that the hook and loop fasteners 23 and 24 are hardly separated from each other against a forward external force. As a result, a space formed in front of each of the arm-rest cover portions 17d is covered with the side surface fixing piece 17j so that the front portion of the seat cushion 17 is covered in the form of box as shown in FIG. 10.

In this state, a baby is laid down on the seat cushion 17, and the waist belt 13 and the crotch belt 14 are surely attached. In the case of using the stroller in this state, a baby can be surely prevented, by means of the get-out preventing cloth 17e, from sliding down through the space between the seat and the protective bar 19 even if the position of the baby is displaced. Moreover, it is not necessary to use any foot cover protective against cold so that the stroller can be comfortably used even in a hot summer season.

Figure 11:
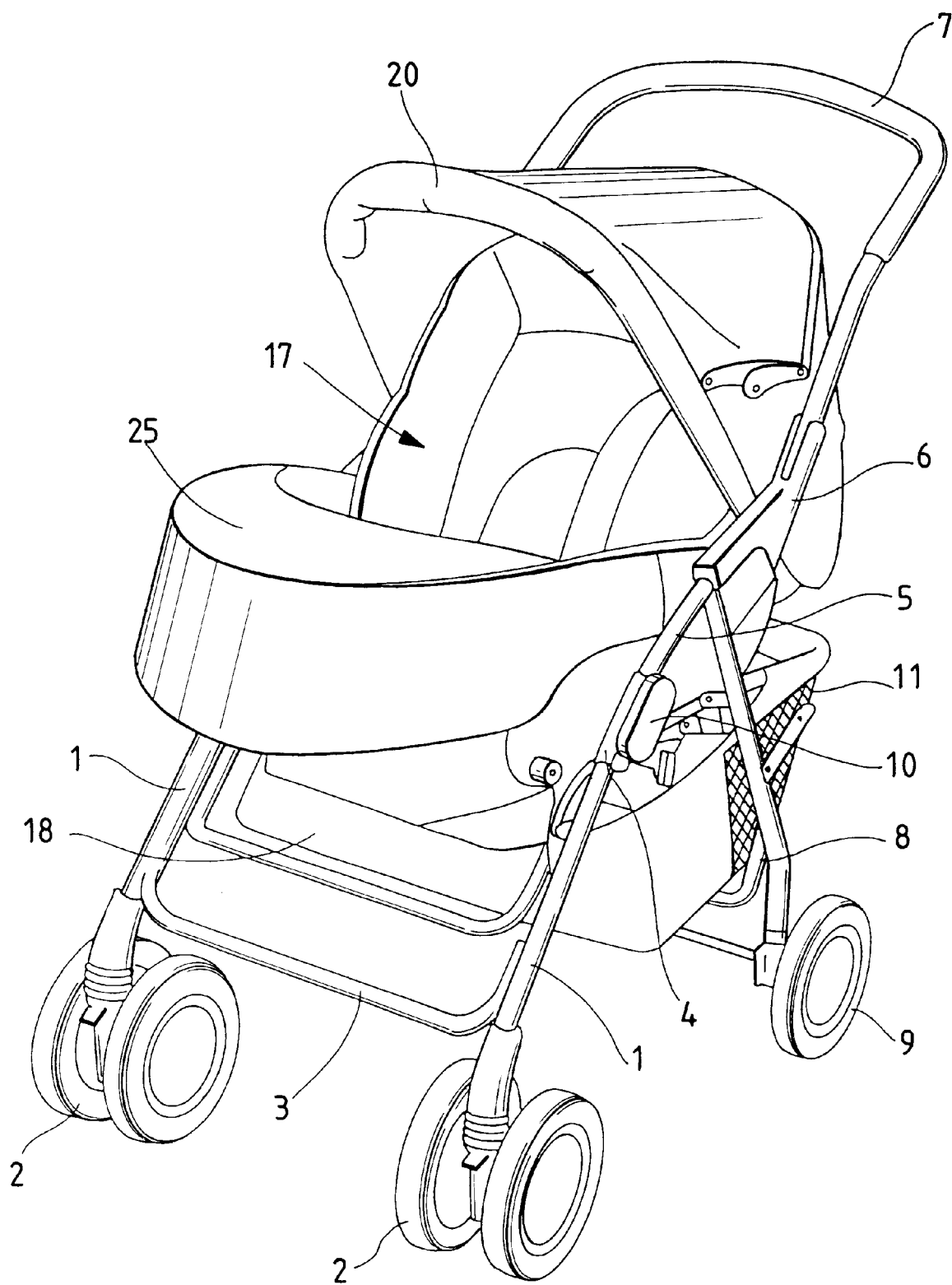
FIG. 11 is a perspective view showing the state where the foot cover is used in the stroller according to the present invention.

In a cold winter season, the get-out preventing cloth 17e is used and a foot cover 25 is further attached to the cloth 17e as shown in FIG. 11 so that it is possible to provide a easily using state even in a cold season.

Next, description will be made about the changing-over operation from the using state of FIG. 10 to an unused state. In such a case, the hook and loop fasteners 22 are separated from each other and the hook and loop fasteners 23 and 24 are also separated from each other. Then, in FIG. 8, the get-out preventing cloth 17e is turned over with respect to the leg-pad portion 17c so as to be positioned under the leg-pad portion 17c. Further, the crotch belt 14 is removed from the first crotch belt through hole 17g. The first and second crotch belt through holes 17g and 17n are made coincident with each other and the crotch belt 14 is inserted through both the holes 17g and 17n (FIG. 7). On the other hand, the get-out preventing cloth 17e is exactly positioned under the leg-pad portion 17c and the seat portion 17a so that so-called stiffness can be prevented. As described above, in an unused state, the get-out preventing cloth 17e is integrated with the seat cushion 17 so as to be located on the lower surface of the seat portion 17a and the leg-pad portion 17c. Therefore, it is not necessary to secure another unused space or the like for accommodating the get-out preventing cloth 17e.

Further, in the case of changing the baby's direction relative to the moving direction of the stroller, the base seat 12 is once removed from the body frame, turned over, and then attached again on the body frame. As a result, the used state can be changed surely between the state where the baby's direction is the same as the moving direction of the stroller and the state where the baby is faced to a person pushing the stroller in accordance with a requirement at that time.

Figure 12:
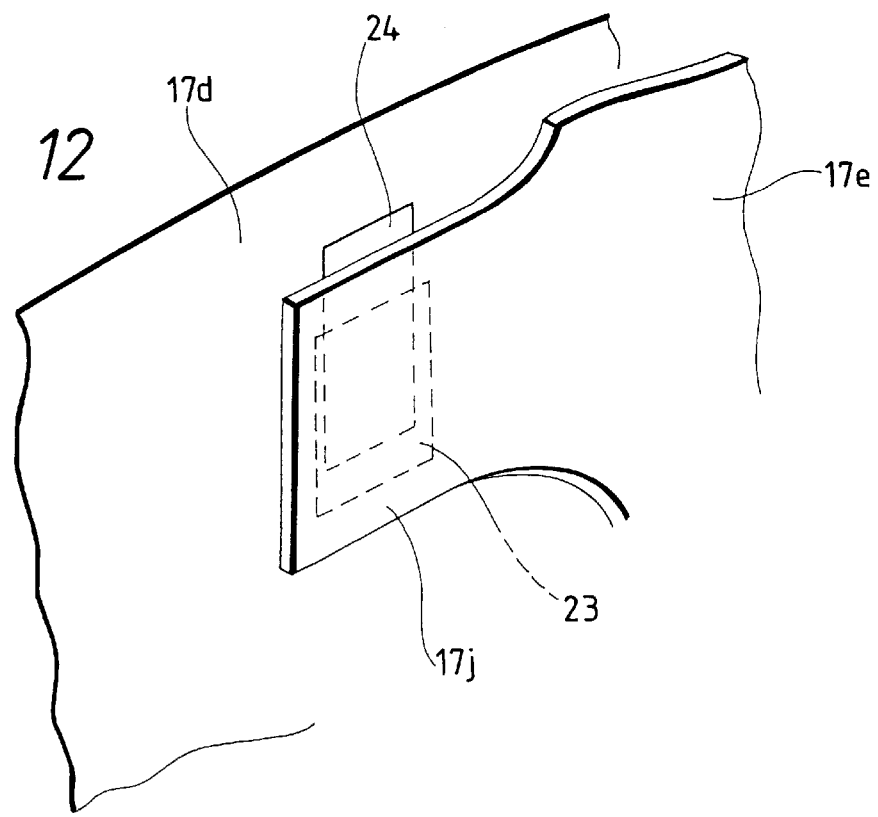
FIG. 12 is a partial perspective view of the seat cushion for explaining the attachment operation of the get-out preventing cloth to be used in the second embodiment of the stroller according to the present invention.

FIG. 12 is a perspective view showing a main part of a second embodiment of the stroller according to the present invention. Description has been made above about the case where the pocket 17f is formed on the inside surface of each of the arm-rest cover portions 17d in the first embodiment. In the second embodiment, however, such a pocket 17f is not formed but a hook and loop fastener 24 is directly attached on the inside surface of each of arm-rest cover portions 17d in this embodiment.

Figure 13:
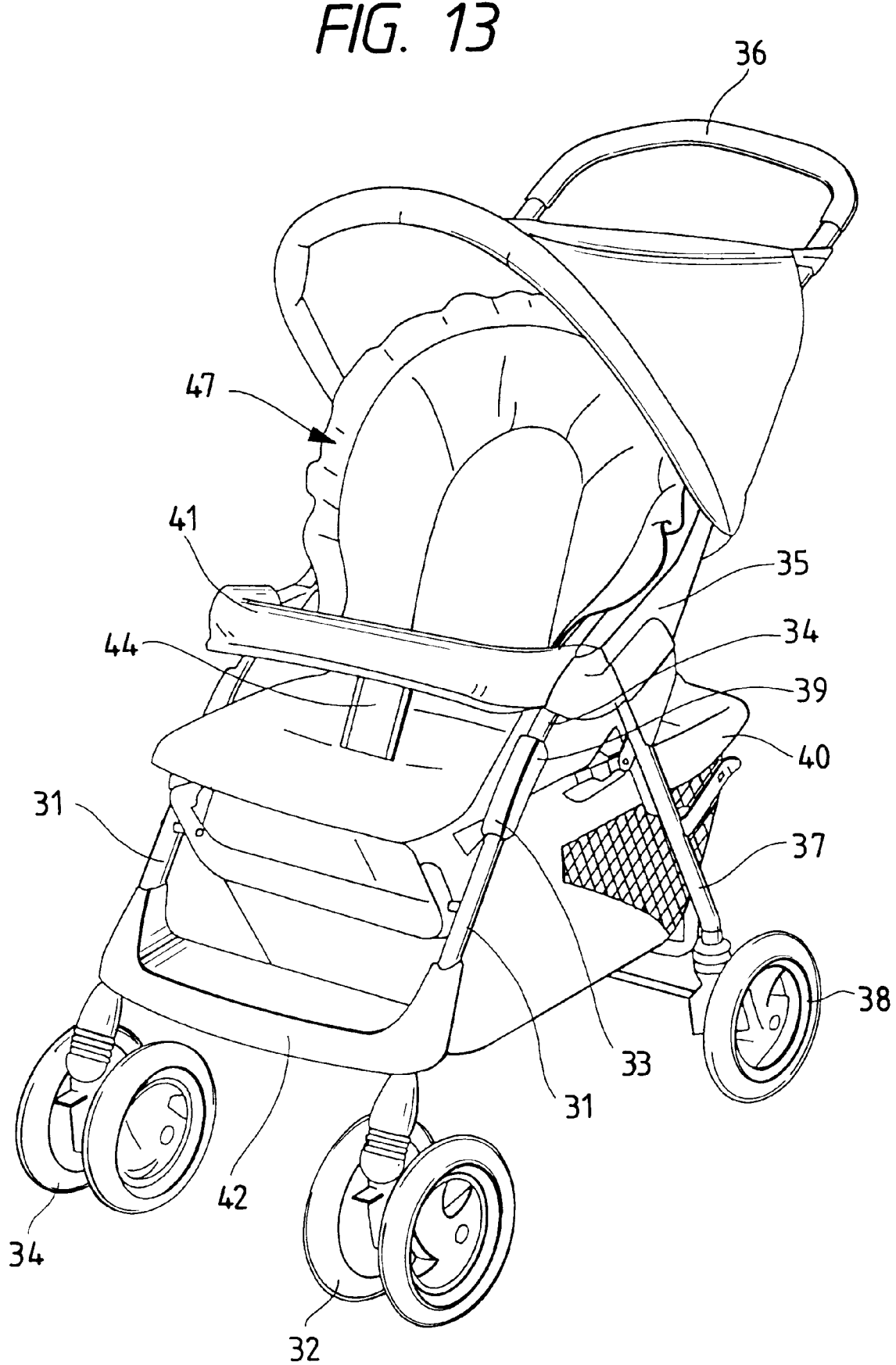
FIG. 13 is a schematic perspective view of a stroller of the third embodiment according to the present invention.

FIG. 13 is a perspective view showing a third embodiment of the stroller according to the present invention. In the drawing, the reference numeral 31 designates front tubes. A pair of front wheels 32 and 32 are rotatably held on a lower end portion of each of the front tubes 31 and 31. An arm rod 34 is connected to a base end portion of each of the front tubes 31 and 31 through a joint 33, and an arm rest 35 is connected to the arm rod 34. A substantially U-shaped handle 36 is provided between the right and left arm rests 35 (one of them is not illustrated). On the other hand, the right and left arm rests 35 are connected to rear tubes 37 respectively, and a rear wheel 38 is rotatably held on a lower end of each of the rear tubes 37. A first lock releasing lever (not shown) for changing-over the state from the opened state to the closed state is provided below the arm rest 35, and a second lock releasing lever 39 is provided on one of the joints 33. A basket 40 functioning as a detail box is provided between the pair of rear tubes 37 and 37 (one of them is not illustrated). The outline of the body frame is thus configured. Further, a protective bar 41 is provided between the pair of arm rests 35. A step 42 is provided between the pair of front tubes 31 and 31.

Figure 14:
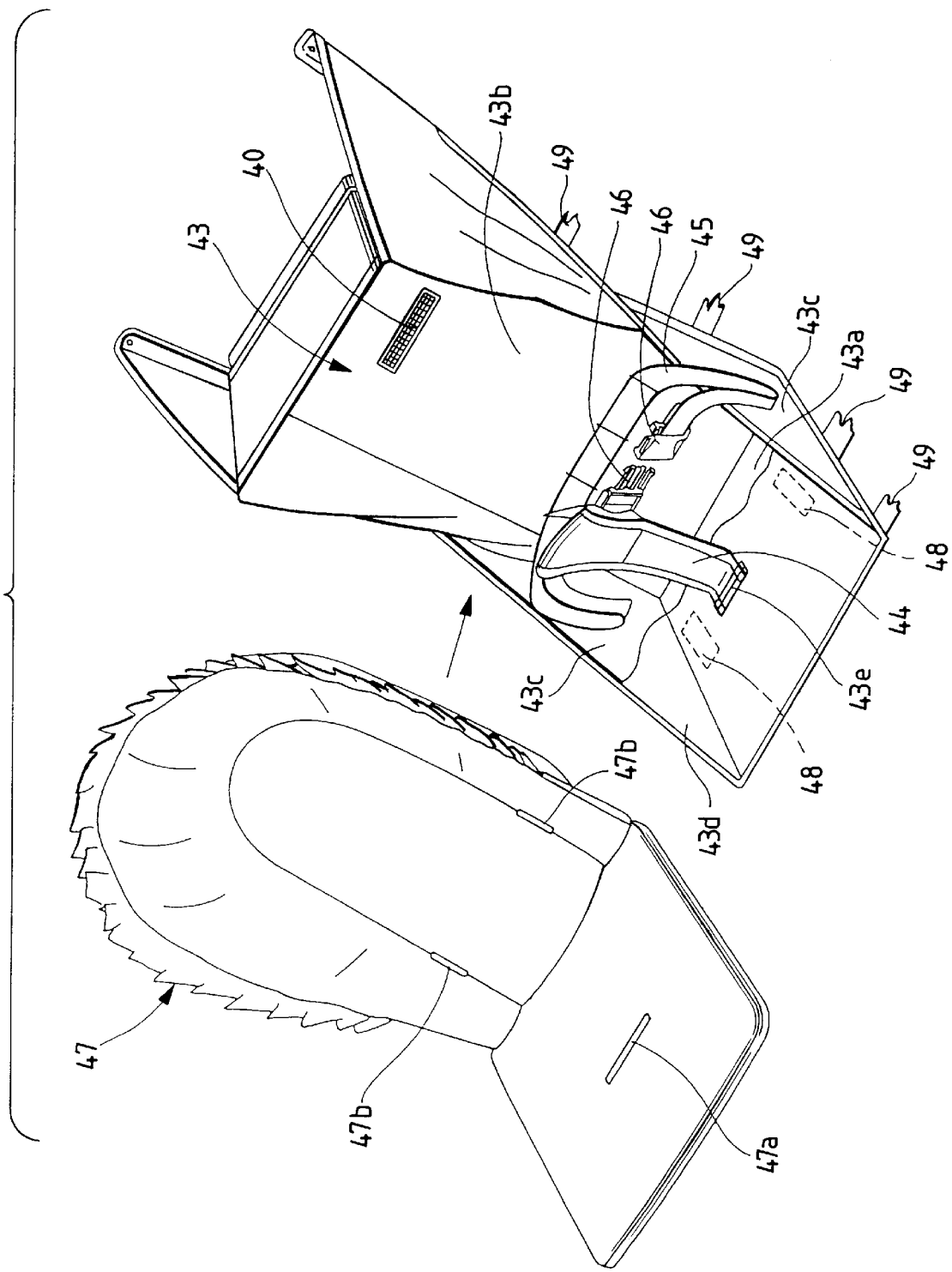
FIG. 14 is an exploded perspective view showing the outline of the seat mechanism portion of the stroller of the third embodiment according to the present invention.
Figure 15:
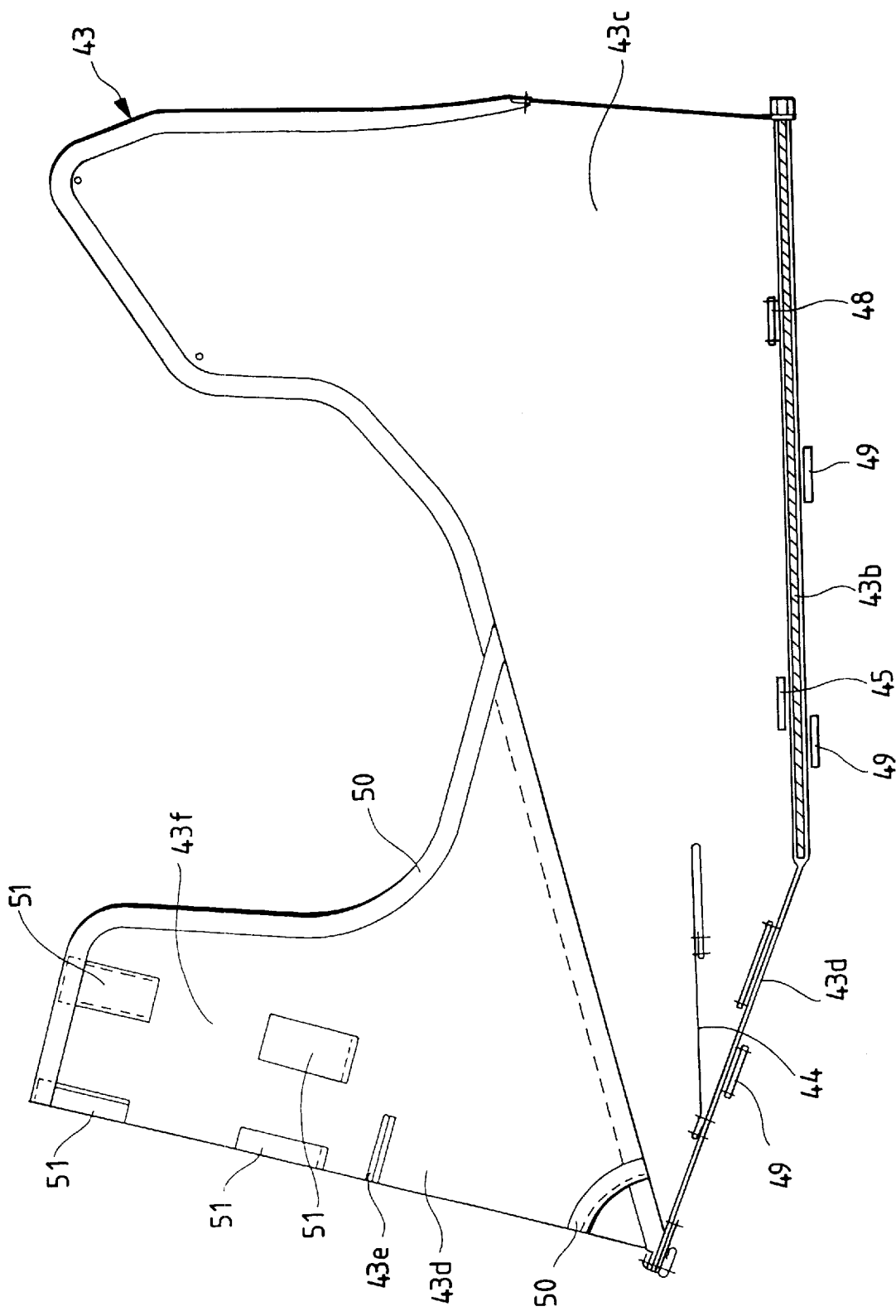
FIG. 15 is a side view of the base seat to be used in the stroller of the third embodiment according to the present invention.

FIG. 14 is an exploded perspective view schematically showing a seat mechanism portion to be attached on the above-mentioned body frame. In the drawing, the reference numeral 43 designates a cloth base seat. The base seat 43 is provided with a seat portion 43a, a back portion 43b provided so as to be continued to the seat portion 43a, and a pair of side portions 43c and 43c attached on the opposite sides of the seat portion 43a respectively. A cloth-like get-out preventing portion 43d is sewn onto the front end of the seat portion 43a. The get-out preventing cloth 43d is sewn not only onto the front portion of the seat portion 43d but also onto the upper ends of the side portions 43c and 43c respectively. This is to make the get-out preventing cloth 43d stand well when it is made to stand for use as shown in FIG. 15. Further, in FIG. 14, a crotch belt through hole 43e through which a crotch belt 44 provided on the seat portion 43a is inserted is formed through the get-out preventing cloth 43d in a suitable position. Further, a waist belt 45 is provided on the back portion 43b. Buckles 46 and 46 which can be engaged with each other are provided on the opposite end portions of the waist belt 45. An upper surface of the base seat 43 is covered with a seat cushion 47. Hook and loop fasteners 48, 48 and 48 provided on the seat portion 43a and the back portion 43b in suitable positions are respectively fastened with hook and loop fasteners (not shown) provided on the seat cushion 47 so as to prevent displacement of the seat cushion 47. Further, a crotch belt through hole 47a and waist belt through holes 47b are formed through the seat cushion 47 so that the crotch and waist belts 44 and 45 are inserted through the crotch and waist belt through holes 47a and 47b respectively at the time of attachment of the seat cushion 47.

Figure 16:
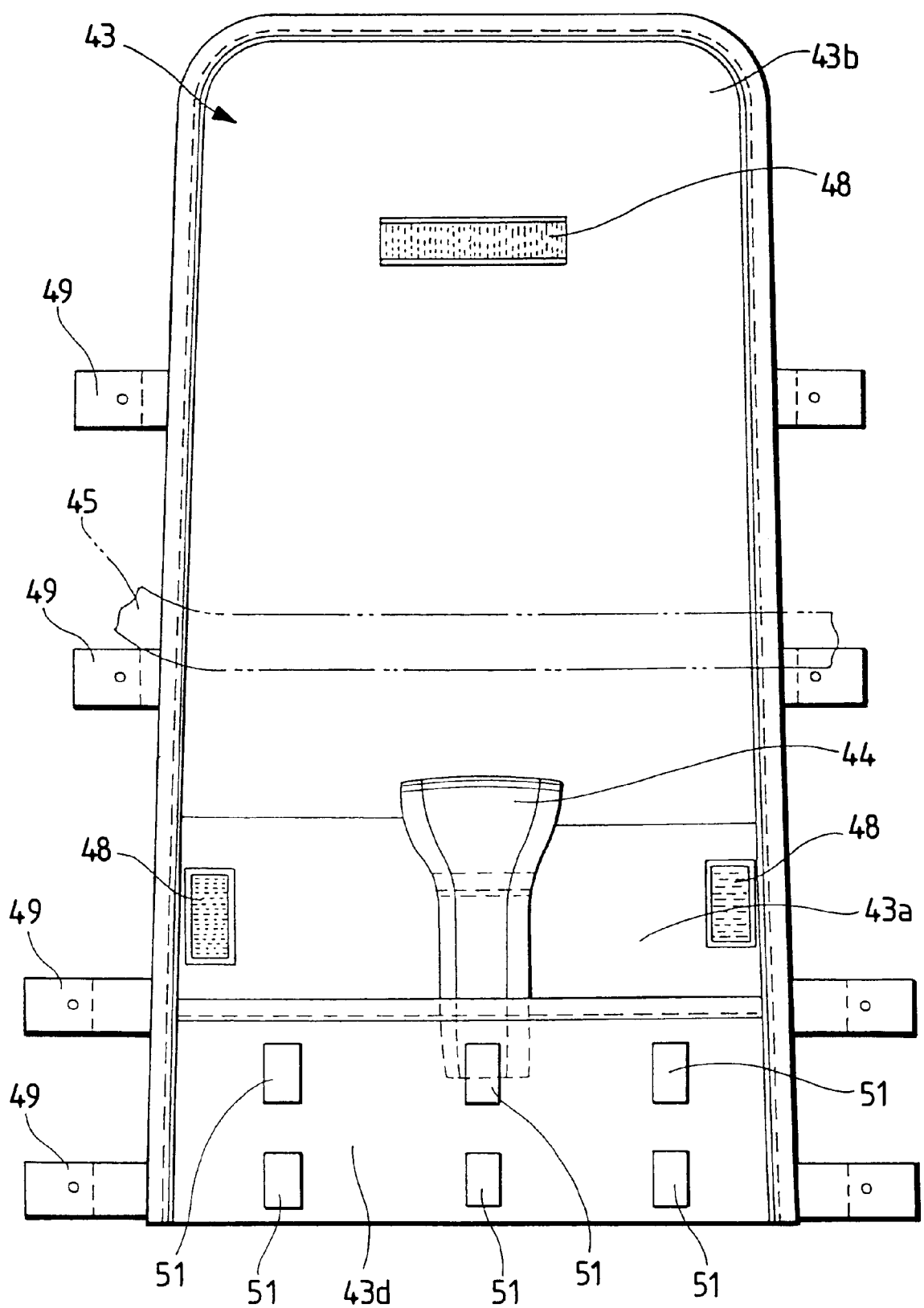
FIG. 16 is a side view of the base seat to be used in the stroller of the third embodiment according to the present invention.

FIG. 16 is a plan view showing the base seat 43. Here, belts 49 and 49, and belts 49 and 49 are provided on the respective lower surfaces of the seat and back portions 43a and 43b so as to fix the base seat 43 on the body frame. When the belts 49 are attached to the frame body, the base seat 43 is fixed to the body.

Figure 17:
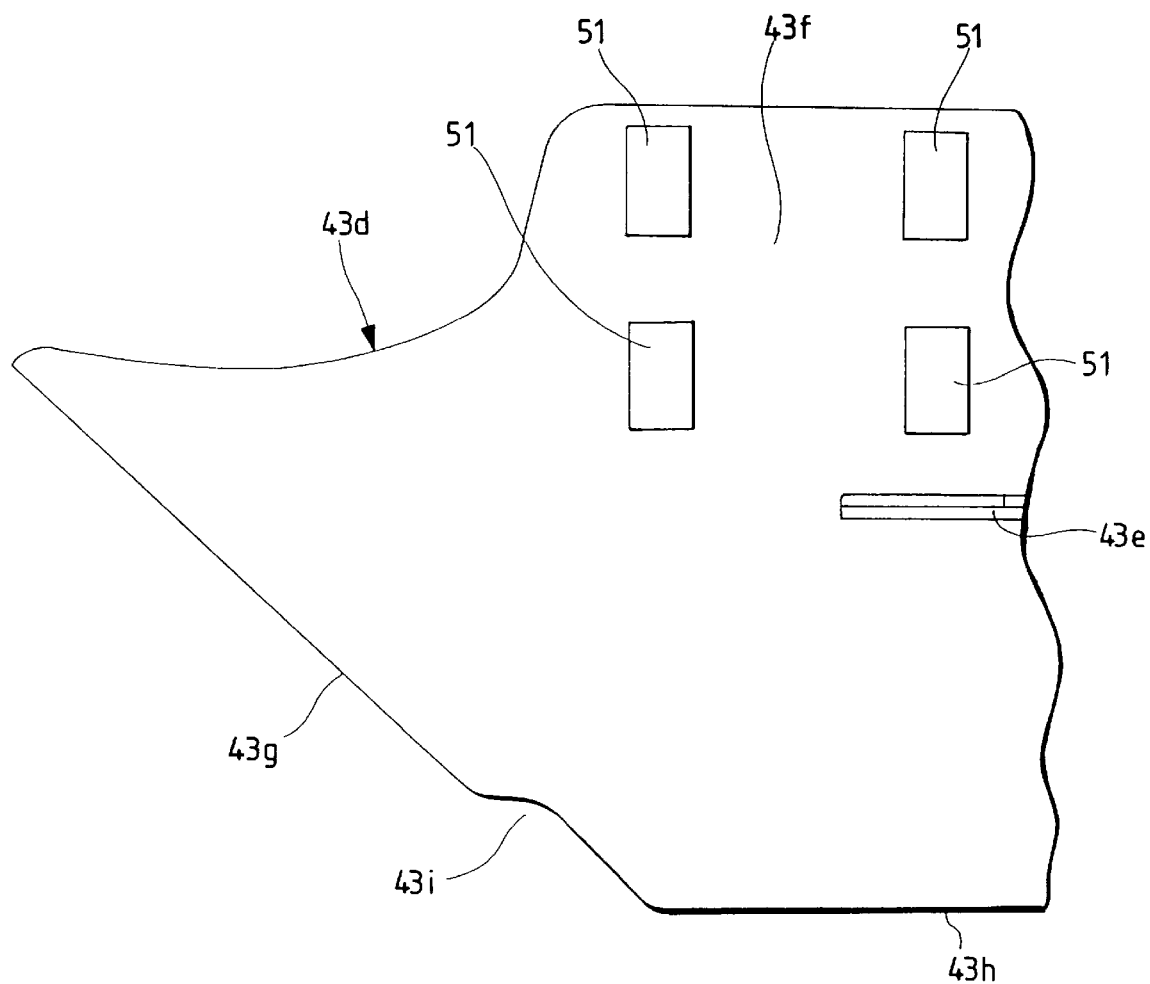
FIG. 17 is a plan view showing the shape of the get-out preventing cloth to be used in the stroller of the third embodiment according to the present invention.

FIG. 17 is a plan view showing the get-out preventing cloth 43d to be used in the stroller according to the present invention.

The get-out preventing cloth 43d is bilaterally-symmetrically formed and it is provided with a protective bar winding portion 43f to be wound around the protective bar 41, side end sewing portions 43g continued to the protective bar winding portion 43f so as to be sewn onto the opposite side ends of the side portions 43c, and a front end sewing portion 43h to be sewn onto a front end of the seat portion 43a. Further, a notch portion 43i is formed between each of the side end sewing portions 43g and the front end sewing portion 43h. The formation of the notch portions 43i makes it possible to prevent the get-out preventing cloth 43d from being deformed both in the using position and in the accommodated position. In FIG. 15, bias tapes 50 are sewn on the side end portions of the get-out preventing cloth 43d so as to prevent the cloth from becoming loose. Further, hook and loop fasteners 51, 51, . . . are provided on the protective bar winding portion 43f. The hook and loop fasteners 51 are configured so as to be fastened with each other when the protective bar winding portion 43f are wound around the protective bar 41 (FIG. 13). Here, particularly, the lower hook and loop fasteners 51 in FIG. 18 are sewn only at their lower ends onto the protective bar winding portion 43f so that the hook and loop fasteners 51 can be smoothly and surely fastened with each other.

Description will be made below about the operation in the case of using the stroller configured as described above.

First, in the ordinary using state, in FIG. 13, the crotch belt 44 is disposed between legs of a baby, the waist belt 45 is wound around the waist portion of the baby, and the buckles 46 are engaged with each other so that the baby can be held on the seat cushion 47 in a stable state. In this state, if one grasps the handle 36 and pushes the stroller, one can move the stroller.

For example, in a case of a few-month-old baby and when it is desirable to lay the baby down on the seat cushion 47, the back portion 43b of the base seat 43 is reclined so that the position of the seat portion 43a is adjusted to be substantially parallel to the back portion 43b. Then, in FIG. 14, the crotch belt 44 is once removed from the crotch belt through holes 47a and 43e, and then inserted again only through the crotch belt through hole 47a. Further, the get-out preventing cloth 47d is made to stand relative to the seat portion 43a as shown in FIG. 15. Thereafter, the protective bar winding portion 43f of the get-out preventing cloth 43d is wound around the outer periphery of the protective bar 41, and the fasteners 51 are fastened with each other (in FIG. 19). At this time, since the lower hook and loop fasteners 51 are sewn only at their lower ends onto the protective bar winding portion 43f, the hook and loop fasteners 51 are wound round the outer periphery of the protective bar 41 so as to make the appearance of the hook and loop fasteners 51 and 51 fastened with each other impressive. As a result, a space between the seat and the protective bar 41 is covered at the front side of the seat cushion 47 so that the front portion of the seat cushion 47 can be covered in the form of box. This is because the get-out preventing cloth 43d is sewn onto the ends of the side portions 43c of the base seat 43. As a result, a box shape having certain strength can be formed in a simplified structure. In this state, a baby is laid down on the seat cushion 47 and the waist belt 45 and the crotch belt 44 are surely attached. In the case of using the stroller in this state, a baby can be surely prevented, by means of the get-out preventing cloth 43d, from sliding down from the space between the seat and the protective bar 41 even if the position of the baby is displaced.

Moreover, it is not necessary to use any foot cover protective against cold so that the stroller can be comfortably used even in a hot summer season.

Figure 20:
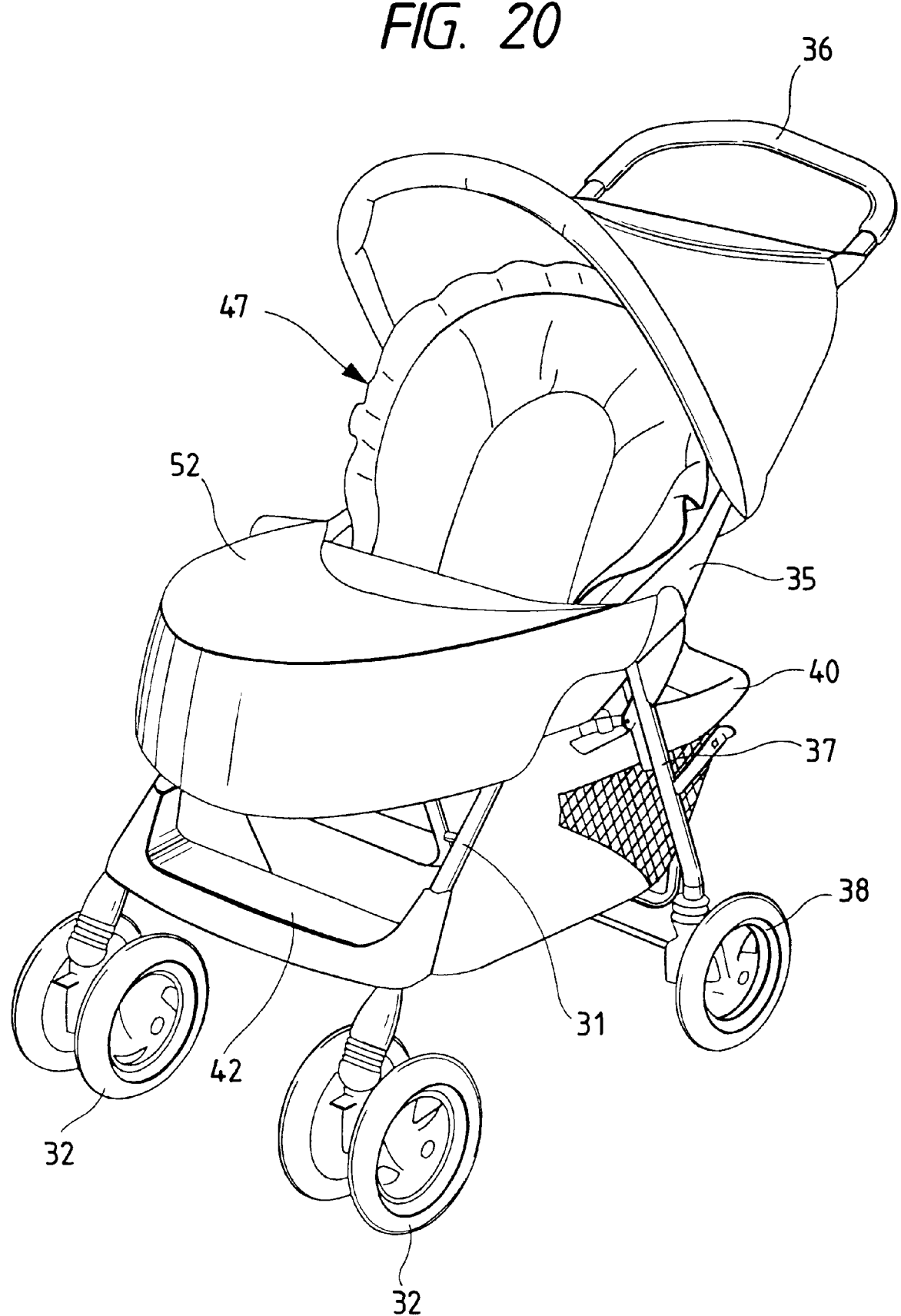
FIG. 20 is a perspective view showing the state where the foot cover is used in the stroller of the third embodiment according to the present invention.

In a cold winter season, the get-out preventing cloth 43d is used and a foot cover 52 is further attached to the cloth 43d as shown in FIG. 20 so that it is possible to provide a easily using state even in a cold season.

Next, description will be made about the changing-over operation from the using state of FIG. 19 to an unused state. In such a case, the hook and loop fasteners 51 are separated from each other. Then, in FIG. 14, the crotch belt 44 is removed from the crotch belt through hole 47a of the seat cushion 47 and inserted through the crotch belt through hole 43e of the get-out preventing cloth 43d. Further, the get-out preventing cloth 43d is positioned on the seat portion 43a. Further, the crotch belt 44 is inserted through the crotch belt through hole 47a of the seat cushion 47. As described above, in an unused state, the get-out preventing cloth 43d is integrated with the base seat 43 so as to be located between the seat portion 43a of the base seat 43 and the seat cushion 47. Therefore, it is not necessary to secure another accommodation space or the like for accommodating the cloth 43d.

Although description has been made above about the case where the get-out preventing cloths 17e and 43d are formed of a cloth-like material in the first, second, and third embodiments, the structure of the get-out preventing portion is not limited to this. For example, the get-out preventing portion may have a structure in which a cushion material such as cotton, foamed urethane, polyester fiber or the like is furnished in the inside, and the surface is covered with cloth or may be a sheet of cotton, synthetic fibers of, for example, polyester, or a thin synthetic resin. In this case, when quilting processing is performed at several places to prevent the furnished members from being displaced, the external appearance is impressive.

Although the hook and loop fasteners 22, 23, 24 and 51 are used for fasteners in the first, second, and third embodiments, the fasteners are not limited to such hook and loop fasteners, but snap fasteners, zip fasteners, or the like, may be used therefor.

Although the get-out preventing cloths 17e and 43d are sewn in the first, second, and third embodiments, the connection means is not limited to sewing, but adhesion, heat sealing, or the like, may be used.

According to the present invention, with the foregoing configuration, the sliding down of a baby can be prevented surely, in a comfortable state throughout the year without using any foot cover for protection against the cold. Further, since the get-out preventing portion is sewn onto the seat cushion or the base seat, it is not necessary to provide any large accommodation space, and it is not necessary to carry the get-out preventing portion separately. Therefore, it is possible to secure the use of the get-out preventing portion in accordance with a requirement in staying outdoors. Since the opposite side ends of the get-out preventing portion are sewn, a box-like shape can be easily formed by a simple structure without using any snap fasteners, zip fasteners, or the like. Further, the cost can be prevented from increasing to thereby realize the stroller at a low cost.

What is claimed is:

1. A baby seat slip down preventing device comprising:
   a base seat provided on a body frame;
   a pair of side members disposed on opposite sides of said base seat;
   a seat cushion removably provided on said base seat, said seat cushion including:
   a seat portion;
   a back portion integral with said seat portion;
   a leg-pad portion provided continuous to said seat portion, said leg-pad portion located at a front side of said seat portion;
   a pair of side-member cover portions provided so as to be opposite to each other and continuous to said seat portion to cover said side members respectively;
   a a restraint portion for preventing slip-down connected to front end and opposite side end portions of said leg-pad portion so that said restraint portion for preventing slip-down takes a used position or an unused position; and
   a protective bar having first and second ends, said first end connected to a side member of said pair of side members, said second end connected to another side member of said pair of side members.

2. A baby seat slip down preventing device according to claim 1, wherein said restraint portion for preventing slip-down including a protective bar winding portion to be wound around said protective bar and first fastener members for holding said protective bar winding portion in a state where said protective bar winding portion is wound around said protective bar.

3. A baby seat slip down preventing device according to claim 2, wherein said first fastener members are hook and loop fasteners.

4. A baby seat slip down preventing device according to claim 3, wherein at least one of said hook and loop fasteners is sewn only at one side onto said get-out preventing portion.

5. A baby seat slip down preventing device according to claim 2, wherein second fastener members are provided on side surface fixing pieces of said restraint portion for preventing slip-down and fastener members to be fastened with said second fastener members are provided on said side-member cover portions respectively.

6. A baby seat slip down preventing device according to claim 5, wherein said second fastener members and said fastener members to be fastened with said second fastener members are hook and loop fasteners.

7. A baby seat slip down preventing device comprising:
   a base seat provided on a body frame;
   a pair of side members disposed on opposite sides of said base seat;
   a seat cushion removably provided on said base seat, said seat cushion including:
   a seat portion;
   a back portion integral with said seat portion;
   a leg-pad portion provided continuous to said seat portion, said leg-pad portion located at a front side of said seat portion;
   a pair of side-member cover portions provided so as to be opposite to each other and continuous to said seat portion to cover said side members respectively, said side-member cover portions provided with pockets;
   a restraint portion for preventing slip-down connected to front end and opposite side end portions of said leg-pad portion so that said restraint portion for preventing slip-down takes a used position or an unused position; and
   a protective bar having first and second ends said first end connected to a side member of said pair of side members, said second end connected to another side member of said pair of side members, said restraint portion for preventing slip-down including a protective bar winding portion to be wound around said protective bar and first fastener members for holding said protective bar winding portion in a state where said protective bar winding portion is wound around said protective bar;
   said restraint portion for preventing slip-down having second fastener members provided on side surface fixing pieces of said restraint portion for preventing slip-down, fastener members to be fastened with said second fastener members are provided in insides of said pockets respectively, and said side surface fixing pieces are accommodated in said pockets respectively in a state where said restraint portion for preventing slip-down is used.

8. A baby seat slip down preventing device according to claim 7, wherein said second fastener members and said fastener members to be fastened with said second fastener members are hook and loop fasteners.

9. A baby seat slip down preventing device according to claim 8, wherein a crotch belt through hole is formed in said restraint portion for preventing slip-down for inserting a crotch belt provided on said base seat in said accommodated position.

10. A baby seat slip down preventing device according to claim 8, wherein said base seat is removably provided on said body frame.

11. A baby seat slip down preventing device according to claim 8, wherein said restraint portion for preventing slip-down is made of cloth.

12. A baby seat slip down preventing device comprising:
   a base seat provided on a body frame, said base seat including:
      a seat portion;
      a back portion provided so as to be continued to said seat portion;
      a pair of side portions provided continuous with said seat portion and so as to be in opposition to each other;
      a restraint portion for preventing slip-down connected to a front end portion of said seat portion and ends of said side portions so that said restraint portion for preventing slip-down takes a used position or an unused position; and
   a protective bar having first and second ends, said first end connected to a side member of said pair of side members, said second end connected to another side member of said pair of side members in front of said base seat.

13. A baby seat slip down preventing device according to claim 12, wherein a multiplicity of through-holes are formed in said restraint portion for preventing slip-down for inserting a waste belt and a crotch belt provided on said base seat in said accommodated position, said waste belt connecting to said crotch belt.

14. A baby seat slip down preventing device according to claim 12, wherein said restraint portion for preventing slip-down including a protective bar winding portion to be wound around said protective bar and fastener members for holding said protective bar winding portion in a state where said protective bar winding portion is wound around said protective bar.

15. A baby seat slip down preventing device according to claim 14, wherein said fastener members are hook and loop fasteners.

16. A baby seat slip down preventing device according to claim 15, wherein at least one of said hook and loop fasteners is sewn only at one side onto said restraint portion for preventing slip-down.

17. A baby seat slip down preventing device according to claim 15, wherein said restraint portion for preventing slip-down is made of cloth.

* * * * *